United States Patent [19]

Longo et al.

[11] 4,388,373

[45] Jun. 14, 1983

[54] COATING PLASTIC SUBSTRATES WITH MINERALS

[75] Inventors: Frank N. Longo, East Northport; Robert A. Miller, Kings Park; Joseph D. Reardon, Smithtown, all of N.Y.

[73] Assignee: Metco, Inc., Westbury, N.Y.

[21] Appl. No.: 269,437

[22] Filed: Jun. 2, 1981

[51] Int. Cl.$^3$ ............................................. C08L 63/00
[52] U.S. Cl. ............................... 428/413; 428/475.5; 428/688; 523/400; 523/440
[58] Field of Search ...................... 260/37 EP, 37 M; 428/413, 414; 525/408, 423; 523/400, 440

[56] References Cited

U.S. PATENT DOCUMENTS

| | | | |
|---|---|---|---|
| 3,271,348 | 9/1966 | Hartong | 525/423 |
| 3,449,280 | 6/1969 | Frigstad | 525/423 |
| 3,542,711 | 11/1970 | Manasia et al. | 260/37 EP |
| 3,678,127 | 7/1972 | Schmid et al. | 525/423 |

OTHER PUBLICATIONS

*Metco,* Application Bulletin, #9619.281, 2/73.

*Primary Examiner*—Lewis T. Jacobs
*Attorney, Agent, or Firm*—Sprung, Horn, Kramer & Woods

[57] ABSTRACT

A flame sprayable powder composition suitable for coating a plastic substrate comprising by weight (a) about 90 to 98% of a flame sprayable mineral powder, (b) about 1 to 5% of a nylon powder, and (c) about 1 to 5% of an epoxy resin powder. The coated plastic may thereafter be overcoated by flame spraying with conventional metal or ceramic powders. The undercoat results in a good bond to the substrate.

11 Claims, No Drawings

COATING PLASTIC SUBSTRATES WITH MINERALS

The present invention relates to flame spraying mineral coatings onto plastic substrates and compositions suitable therefor.

Many mechanical parts in automobiles and airplanes have special mineral coatings such as metal or ceramic for special properties such as hardness, wear resistance, etc. Such coatings are provided on parts such as gears, pulleys, shafts, and the like, made of metal. However, the metal part itself is often just a carrier for the coating and could be replaced by lighter weight, often easier to fabricate, plastic if it were possible suitably to coat the plastic.

A simple technique for coating surfaces with metal or ceramic is by flame spraying, employing either powder or wire. When attempting to flame spray onto plastic, however, special problems are encountered. Upon cooling, the sprayed metal contracts and may warp or distort the plastic. The coating sometimes fails to adhere uniformly. The plastic substrate may melt from the material being sprayed and lose its shape, or the plastic surface may burn or decompose.

It is accordingly an object of the invention to provide flame sprayed mineral coatings on plastic surfaces which are strongly adherent and true, and to provide compositions suitable therefor.

In accordance with the present invention it has been found that plastic substrates can be flame sprayed with a mineral powder which has been admixed with small amounts of nylon and epoxy polymers, also advantageously in powder form. Advantageously the powder particles in finely sub-divided form are contacted with a binder or adhesive, mixed and dried, the agglomerates which form being composed of sub-particles of the individual components and being screened to recover particles of a particular size.

The resulting agglomerates, or less desirably the initial powder mixture itself, can be flame sprayed in conventional manner onto the substrate. The coating can range in thickness from about 25 μm to 5 mm or greater.

In accordance with another aspect of the invention the coating can serve as an undercoat onto which other mineral coatings can be flame sprayed. Thus if one wanted to overcoat ten plastic gears each with a different but commercially available metal coating, a single base coat will suffice for all.

The substrate can comprises substantially all plastics, thermoplastic as well as thermoset, e.g. nylon, polyphenylene oxide, polycarbonate, polyaryl ether, acetal, polysulfone, polyethersulfone, polyester, polyimide, polyamide-imide, polyphenylene sulfide, phenolic, alkyd, diallyl phthalate, epoxy, ABS, etc., as well as mixtures thereof. They may be used per se or with fillers, reinforcements, and the like, e.g. glass fiber, graphite, silica, etc. Advantageously the plastic does not distort or significantly soften below about 200° F.

The coating composition comprises about 50 to 98% and preferably about 85 to 95% by weight of a flame sprayable powder, about 1 to 25% and preferably about 2.5 to 7.5% weight of a nylon powder and about 1 to 25% and preferably about 2.5% to 7.5% weight of an epoxy resin powder, i.e. preferably approximately equal weights of nylon and epoxy.

When the mineral in the coating is a metal, the coating composition advantageously comprises about 70 to 98%, and preferably about 95% by weight of a flame sprayable metal powder, about 1 to 15% and preferably about 2.5% by weight of a nylon powder and about 1 to 15% and preferably about 2.5% by weight of an epoxy resin powder; i.e. preferably approximately equal weights of nylon and epoxy.

When the mineral in the coating is a nonmetal, e.g. an oxide ceramic or a carbide, the coating composition advantageously comprises about 50 to 99%, and preferably about 85% by weight of a flame sprayable nonmetal powder, about 1 to 25% and preferably about 7.5% by weight of a nylon powder and about 1 to 25% and preferably about 7.5% by weight of an epoxy resin powder, i.e. preferably approximately equal weights of nylon and epoxy.

The mineral powder can be any of those described in U.S. Pat. No. 3,617,358, issued in the name of Ferdinand J. Dittrich on Nov. 2, 1971, the disclosure of which is incorporated herein by reference. These include, but are not limited to, the conventional metals, alloys or mixtures of metals used in this art as well as:

Oxides, as for example refractory oxides, such as alumina $Al_2O_3$, beryllia $BeO$, ceria $CeO_2$, chromia $Cr_2O_3$, cobalt oxide $CoO$, gallium oxide $Ga_2O_3$, hafnia $HfO_2$, magnesia $MgO$, nickel oxide $NiO$, tantalum oxide $Ta_2O_5$, thoria $ThO_2$, titania $TiO_2$, yttrium oxide $Y_2O_3$, zirconia $ZrO_2$, vanadium oxide $V_2O_5$, niobium oxide $NbO$, manganese oxide $MnO$ iron oxide $Fe_2O_3$, zinc oxide $ZnO$; complex aluminates such as $BaO$, $Al_2O_3$, i.e. $BaO.Al_2O_3$, $CoO.Al_2O_3$, $Gd_2O_3.Al_2O_3$, $K_2O .Al_2O_3$, $Li_2O.Al_2O_3$, $MgO.Al_2O_3$, $NiO.Al_2O_3$, $Sr_2O_3.Al_2O_3$, $SrO.Al_2O_3$, $SrO.2Al_2O_3$, $2Y_2O_3.Al_2O_3$, $ZnO.Al_2O_3$; zirconates such as $CaO.ZrO_2$, $SrO.ZrO_2$; titanates such as $Al_2O_3.TiO_2$, $2BaO.TiO_2$, $HfO_2.TiO_2$, $2MgO.TiO$, $SrO.TiO_2$; chromates, such as $CaO.Cr_2O_3$, $CeO.Cr_2O_3$, $MgO.Cr_2O_3$, $FeO.Cr_2O_3$; phosphates such as $Al_2O_3.P_2O_5$, $3BaO.P_2O_5$, $3CaO.P_2O_5$, $3SrO.P_2O_5$; and other mixed oxides, such as $La_2O_3.Fe_2O_3$, $MgO.Fe_2O_3$, $2MgO.GeO_2$, $CaO.HfO_2$, $La_2O_3.2HfO_2$, $Nd_2O_3. 2HfO_2$, $6BaO.Nb_2O_5$, $Dy_2O_3.Nb_2O_5$, $2MgO.SnO_2$, $BaO.ThO_2$, $SrO.UO_3$, $CaO.UO_3$, $CeO_2.Cr_2O_3$; silicates such as $3Al_2O_3.2SiO_2$ (mullite), $BaO.2SiO_2$, $BaO.Al_2O_3SiO_2$, $BaO.TiO_2.SiO_2$, $2CaO.SiO_2$, $Cr_2O_3.SiO_2$, $Er_2O_3.SiO_2$, $ZrO_2.SiO_2$ (zircon), $2MgO.SiO_2$, $ZrO.ZrO_2.SiO_2$; carbides, such as titanium carbide $TiC$, zirconium carbide $ZrC$, hafnium carbide $HfC$, vanadium carbide $VC$, niobium carbide $NbC$, tantalum carbides $TaC$, $Ta_2C$, chromium carbides $Cr_3C_2$, $Cr_7C_3$, $Cr_{23}C_6$, molybdenum carbides $Mo_2C$, $MoC$, tungsten carbides $WC$, $W_2C$, thorium carbides $ThC$, $ThC_2$; complex carbides, such as $WC+W_2C$; $ZrC+TiC$, $HfC$; $NbC$, $TaC$, or $VC+TiC+HfC$, $TaC$, $NbC$, or $VC$; $VC+NbC$, $TaC$, or $HfC$; $HfC+TaC$ or $NbC$; $HbC+TaC$; $WC+TaC$, $NbC$, $ZrC$, $TiC$; $WC+TiC$ or $ZrC$; $TiC+Cr_3C_2$; $TiC+Mo_2C$;

Borides, such as $TiB_2$, $ZrB_2$, $HfB$ or $HfB_2$, borides of V, borides of Nb, borides of Ta, borides of Cr, borides of Mo, borides of W, borides of the rare earth metals;

Silicides, such as silicides of Ti, e.g. $Ti_5Si_3$
Silicides of Zr, e.g. $Zr_6Sr_5$
Silicides of Hf, e.g. $Hf_5Si_3$
Silicides of V, e.g. $V_3Si$ or $VSi_2$
Silicides of Nb, e.g. $Nb_5Sr_3$ or $NbSi_2$
Silicides of Ta, e.g. $Ta_5Si$ or $TaSi_2$
Silicides of Mo, e.g. $MoSi_2$
Silicides of W, e.g. $WSi_2$ Silicides of Cr, e.g. $Cr_3Si$ or $Cr_3Si_2$
Silicides of B, e.g. $B_4Si$ or $B_6Si$
Silicides of the rare earth metals;
Nitrides such as boron nitrides and silicon nitrides
Sulfides such as $MgS$, $BaS$, $GrS$, $TiS$, $ZrS$, $ZrS_2$, $HfS$, $VS$, $V_2S_3$, $CrS$, $MoS_2$, $WS_2$, the various rare earth sulfides;
Metalloid elements such as boron, silicon, germanium;
Cermets, such as $WC/Co$, $W_2C/Co$, $WC+W_2C/Co$, $Cr/Al_2O_3$, $Ni_{2/3}Al_2O_3$, $NiAl/Al_2O_3$, $NiAl/ZrO_2$, $CO/ZrO_2$, $Cr/Cr_3C_{22}O_3$, $Co/TiC$, $Ni/TiC$, $Co/WC+TiC$, $TiC/NiCr$, $Cr+Mo/Al_2O_3$, $Ni$, $Fe$ and/or their alloys, $Cu$ and/or its alloys such as aluminum bronze, phosphor bronze, etc., with the disulfides or diselenides of $Mo$, $W$, $Nb$, $Ta$, $Ti$, or $V$, or boron nitride for self-lubricating coatings with very low friction coefficient;
Cermets which contain an active metal from the group composed of $Ti$, $Zr$, $Ta$, $Cr$, etc., or hydrides or other compounds or alloys of these active metals, which will alloy with the metal phase of the cermet and promote adhesion of the metal phase to the refractory phase by promoting wetting of the surface of the refractory phase;
Cermets, for instance those containing a metal and a carbide as the refractory phase, which also contain free carbon, such as high purity graphite or the like, which will effectively reduce or prevent oxidation of the carbide phase and reduce solutioning of the carbide phase in the metal binder phase;

The mineral powders whether single materials, mixtures and/or agglomerates are desirably no more than about 140 mesh in size. Larger particles result in a poorer quality of coating and may even result in interruption of the spraying operation. Advantageously, the mineral powder particles are no more than about 325 mesh but are at least about $1\mu$, smaller particles being too fine to be properly propelled to the substrate.

The composite particles desirably range in size from about 5 to $180\mu$ of which the mineral subparticles are less than about $100\mu$ and the nylon and epoxy particles less than about $80\mu$.

The nylon powder can by nylon 6, 6/6, 6/10 or 6/12 or a thermoplastic polyamide-polyimide although nylon 11 and/or nylon 12 are particularly suitable. Copolymers are also permissible. The melting point of the polymer is advantageously above about 120° C. and preferably above about 150° C. The particle size is about 5 $\mu$m to 80 $\mu$m and preferably about 20 $\mu$m to 65 $\mu$m.

The particle size of the epoxy resin is about 5 $\mu$m to 80 $\mu$m and preferably about 5 $\mu$m to 45 $\mu$m. The melting point and curing temperature of the epoxy resin are advantageously above about 100° C. and preferably above about 120° C.

Epoxy polymers which can be employed include condensation products of bis-phenol-A and epichlorohydrin which can be cross-linked with polyfunctional agents such as di-carboxylic acids or anhydrides, diamines, or the like. Representative epoxy resins are described in Encyclopedia of Polymer Science and Technology by Mark et al Vol. 6 (1967) pages 213 to 219 and cross-linking curing agents are described at pages 222 to 238, the disclosures of which are incorporated herein by reference.

The powder particles may simply be physically mixed. However, there may be a tendency to segregation so it is desirable to form agglomerates of the several powders employing binders or adhesives which may be present in up to about 100% by weight of the total of mineral, nylon and epoxy powders, advantageously less than about 50% and preferably less than about 25%. To make the maximum use of the binder it is preferably added as a solution or dispersion so as to wet all particles fully, the moist mass is dried to remove the solvent and the residue is mixed to break the agglomerates into smaller particles desirably less than about 180 $\mu$m and preferably less than about 150 $\mu$m. Obviously where agglomerates are employed it is advantageous to use smaller subparticles of the mineral, nylon and epoxy resin.

Suitable binders include polyvinyl pyrrolidone, polyvinyl acetate, polyvinyl chloride, phenolics, and the like. Suitable solvents include water, alcohol, naphtha, and the like.

Advantageously the plastic surface which is being sprayed is first prepared by grit blasting to produce better adhesion with the coating, although this is not always essential. Thereafter the powder mixture or aggregate is then flame sprayed in conventional manner employing a suitable gun such as sold by Metco as Type 3MB or 7MB plasma flame spray gun or Type 5P or 6P combustion flame spray gun. The coating may be sprayed to any desired thickness but if it is intended as an undercoat for a subsequent overcoat of conventional type, i.e. mineral without nylon and epoxy, the undercoat should range from about 25 $\mu$m to 2 mm in thickness, preferably from about 100 to 500 $\mu$m.

When an overcoat is to be provided it may comprise any of the minerals hereinabove set forth, applied in conventional manner and thickness. However, because of the undercoat far better adhesion and less distortion results than in the absence of the undercoat.

The invention will be further described in the following illustrative examples wherein all parts are by weight unless otherwise expressed. Parts could of course be expressed in volume, the specific gravity of nylon 12, for example, being about 1, that of epoxy resin being about 1.2 and that of mineral varying but being about 8 in Example 1, for instance.

EXAMPLE 1

950 Grams of a powder of 5 to 74 $\mu$m composed of an austenitic stainless steel alloy are blended with 25 grams of nylon 11 powder, identified as Rilsan 11 ES15-10 and having a softening point of about 367° F., and 25 grams of an epoxy resin powder, identified as Ferro VE102 and having a softening point of about 200° F.

To the mixture there are added 30 grams of polyvinyl pyrrolidone dissolved in sufficient water to bring the solution to a total volume of 200 ml (15%). The mixture is stirred while heated to 180° F. to drive off the water. The agglomerated particles are shaken until they fall through a 100 mesh sieve, i.e. opening of 149 $\mu$m. 800 grams of agglomerated particles are recovered.

A plastic panel molded of polycarbonate reinforced structural foam was prepared for coating by blasting with a grit of $Al_2O_3$. Then the panel was flame sprayed with the agglomerated particles to a thickness of 150 $\mu$m. Flame spraying was effected using a plasma flame made up of nitrogen and hydrogen supplied to a Metco Type 7MB plasma flame gun employing the following parameters:
GE Nozzle

2 Powder Port
Pressures 50 $N_2$/5$OH_2$ psi
flows 150 $N_2$/5$H_2$
350 amp; 65–75 volts
5 lb/hr
5" spray distance
37 carrier flow
air vibrator 15 psi
parallel coolers 75 psi The resultant product had a hardness of $R_{15Y}$ 80 to 90 and was suitably rough, at least 500 microinches aa, so as to be ideal for subsequent application of a mineral overcoat. After deposition of the overcoat, the bond to the plastic substrate was so tenacious that in test fractures metal particles adhered to the plastic substrate, pointing up the strong adhesion of the undercoat-overcoat combination to the plastic. Overcoating actually enhanced the adhesion of the undercoat to the substrate. The hardness of a molybdenum cast iron overcoat sprayed onto the undercoat was Rc44.

Aluminum-bronze, nickel chromium and austenitic stainless steel also gave strongly adherent overcoats.

The following table shows the strength of the bond between the substrate and undercoat for a variety of substrates flame sprayed as just described:

TABLE 1

| Substrate | A<br>Bond Strength<br>(PSI)* | B<br>Tensile Strength<br>of Base Resin<br>(PSI)** | A/B |
|---|---|---|---|
| Phenolic/Glass | | | |
| Durez 156 | 1242 | 7500 | 0.17 |
| Durez 29502 | 1618 | 7000 | 0.23 |
| Durez 29053 | 1152 | 6000 | 0.19 |
| Polyethersulfone /20% Glass | | | |
| Fiberite RTP1403 | 2322 | 12000 | 0.19 |
| Polysulfone | | | |
| Udel P1700 | 2411 | 10200 | 0.24 |
| Polyarylate | | | |
| Ardel D100 | 1746 | 9500 | 0.18 |
| Polyaryl Ether | | | |
| Arylon T | 1536 | 7500 | 0.20 |
| Polycarbonate /30% Glass | | | |
| Fiberfil J50/30 | 2235 | 9500 | 0.24 |
| Thermoplastic Polyester (PBI) | | | |
| Tenite 6PROA | 1782 | 8000 | 0.22 |

TABLE 1-continued

| Substrate | A<br>Bond Strength<br>(PSI)* | B<br>Tensile Strength<br>of Base Resin<br>(PSI)** | A/B |
|---|---|---|---|
| (MILD STEEL | 2500) | | |

*Avg. of 2 to 3 tests
**Phenolic values are for base resin + filler, others without filler.

EXAMPLE 2

In similar manner a glass fiber-reinforced phenolic substrate was flame sprayed with a powder agglomerate differing only in that it was composed of 90% by weight of austenitic stainless steel and 5% of each of nylon and epoxy. The resulting surface was well bonded, could be as thick as desired and exhibited good lubricity, impact resistance and very low porosity, although its smoother surface was not as receptive for overcoating with flame sprayed metal.

The bond strength is shown in the following table:

TABLE II

| Substrate | A<br>Bond Strength<br>(PSI)* | B<br>Tensile Strength<br>(PSI) | A/B |
|---|---|---|---|
| Phenolic/Glass | | | |
| Durez 156 | 1374 | 7500 | 0.18 |
| Durez 29502 | 1794 | 7000 | 0.26 |
| Durez 29053 | 1528 | 6000 | 0.26 |

*Avg. of 3 tests

EXAMPLE 3

In generally similar manner two different substrates were preheated to 200° F. and then flame sprayed with agglomerates of the austenitic stainless steel with different amounts of nylon and epoxy to different thicknesses, followed by overcoating with flame sprayed cast iron. The results obtained are shown in Table III.

TABLE III

| Weight %(1) | | | Average Bond Strength (psi) | | | |
|---|---|---|---|---|---|---|
| | | | Polycarbonate-glass fiber | | Phenolic-glass fiber | |
| Stainless Steel | Epoxy | Nylon | Undercoat .020" | Undercoat .010" Moly cast iron overcoat .006" | Undercoat .020" | Undercoat .010" Moly cast iron overcoat .010" |
| 95 | 0 | 5 | 886 | Not tested | 990 | Not tested |
| 95 | 1.25 | 3.75 | 1440 | No adhesion | 1338 | 1243 |
| 95 | 2.5 | 2.5 | 1537 | 2542 | 886 | 1803 |
| 95 | 3.75 | 1.25 | 1441* | No adhesion | 1082 | 556 |
| 95 | 5 | 0 | No adhesion | Not tested | No adhesion | Not tested |
| 92.5 | 1.875 | 5.625 | 1090 | No adhesion | 1185 | 1178 |
| 92.5 | 3.75 | 3.75 | 1278 | 1699 | 2189 | 1332 |
| 92.5 | 5.625 | 1.875 | 1250 | 1140 | 1650 | 1125 |

*Fracture occurred between substrate and metal slug, not within coating. On retest, fracture occurred within coating, but at lower psi.
All results are the average of 2 to 3 tests.
(1)Epoxy: Farbond black ES grade powder
Nylon: Emser Grilamid black nylon 12 ES grade powder

EXAMPLE 4

Panels of ⅛ inch thickness were flame sprayed to a thickness of 0.01 inch with the agglomerates of Example 1 and then overcoated with flame sprayed nichrome to a thickness of 0.01 inch. The physical properties of the panels are set forth in Table 4.

TABLE 4

| Temp (°F.) | Property | Material | Property Measurement (psi) | | |
|---|---|---|---|---|---|
| | | | Overcoated in Tension | Overcoated in Compression | Uncoated |
| 72 | Flexural Modulus | ABS/PC* | $1.16 \times 10^6$ | $1.19 \times 10^6$ | $3.80 \times 10^5$ |
| | | PC/G** | $1.43 \times 10^6$ | $1.42 \times 10^6$ | $4.21 \times 10^5$ |
| | Flexural Strength @ 5% | ABS/PC | 23125 | 26627 | 13197 |
| | | PC/G | 28852 | 30526 | 13192 |
| | Ultimate Tensile Strength | ABS/PC | 23805 | 26982 | 13381 |
| | | PC/G | 29188 | 33481 | 13709 |
| ABS/PC 200° F. PC/G 270° F. | Flexural Modulus | ABS/PC | $8.44 \times 10^5$ | $9.78 \times 10^5$ | $2.68 \times 10^5$ |
| | | PC/G | $1.12 \times 10^6$ | $1.16 \times 10^6$ | $3.41 \times 10^5$ |
| | Flexural Strength @ 5% | ABS/PC | 12824 | 14585 | 7543 |
| | | PC/G | 13338 | 12806 | 7363 |
| | Ultimate Tensile Strength | ABS/PC | 12824 | 16364 | 7818 |
| | | PC/G | 14314 | 17492 | 7363 |

*ABS/Polycarbonate
**Polycarbonate + 10% Glass

These data show that the application of the undercoat with the nichrome overcoat imparts added stiffness to plastic panels, giving coated panels at 200°–270° F. the same resistance to bending as uncoated panels at room temperature. The stiffening effect is roughly comparable to that brought about by electroplated metal on plastic, or fiber reinforcement of plastic.

EXAMPLE 5

Graphite fiber reinforced epoxy tubes were flame sprayed to a thickness of 0.01 inch with the agglomerates of Example 3 and then overcoated with flame sprayed alumina-titania ceramic to a thickness of 0.01 inch. The ceramic was tightly bonded to the substrate and did not spall off or crack on cooling from the spraying temperature to room temperature.

EXAMPLE 6

Thermoplastics other than nylon and thermosetting resins other than epoxy may also be suitable for agglomeration with a mineral constituent, giving composite powders which, when sprayed, product coatings with properties similar to those of mineral-nylon-epoxy coatings. For example, austenitic stainless steel powder may be agglomerated with 2.5 weight % each of thermoplastic polyester and thermoset polyester powders.

It will be appreciated that the instant specification and examples are set forth by way of illustration and not limitation, and that various modifications and changes may be made without departing from the spirit and scope of the present invention.

What is claimed is:

1. A flame sprayable powder composition suitable for coating a plastic substrate, comprising by weight
   (a) about 70 to 98% of a flame sprayable mineral powder,
   (b) about 1 to 25% of a nylon powder, and
   (c) about 1 to 25% of an epoxy resin powder.

2. A flame sprayable powder composition according to claim 1, comprising by weight
   (a) about 50 to 98% of a flame sprayable nonmetallic mineral powder,
   (b) about 1 to 25% of a nylon powder, and
   (c) about 1 to 25% of an epoxy resin powder.

3. A flame sprayable powder composition according to claim 1, comprising by weight
   (a) about 70 to 98% of a flame sprayable metal powder,
   (b) about 1 to 15% of a nylon powder, and
   (c) about 1 to 15% of an epoxy resin powder.

4. A composition according to claim 1, wherein the powder has a particle size of about 5 to 180 μm and comprises mineral subparticles (a) of less than about 110 μm.

5. A composition according to claim 1, wherein (b) and (c) are present as subparticles of less than about 80 μm.

6. A composition according to claim 5, comprising by weight
   (a) about 95% of a flame sprayable metal powder,
   (b) about 2.5% of a nylon powder, and
   (c) about 2.5% of an epoxy resin powder.

7. A composition according to claim 5, comprising by weight
   (a) about 85% of a flame sprayable nonmetallic mineral powder,
   (b) about 7.5% of a nylon powder, and
   (c) about 7.5% of an epoxy resin powder.

8. A process for coating a plastic substrate with a mineral, comprising flame spraying onto said substrate a powder composition according to claim 1.

9. A process according to claim 8, including the further step of flame spraying onto the coated substrate a powder consisting essentially of a mineral.

10. A coated substrate produced by the process of claim 9.

11. A coated substrate produced by the process of claim 8.

* * * * *